UNITED STATES PATENT OFFICE.

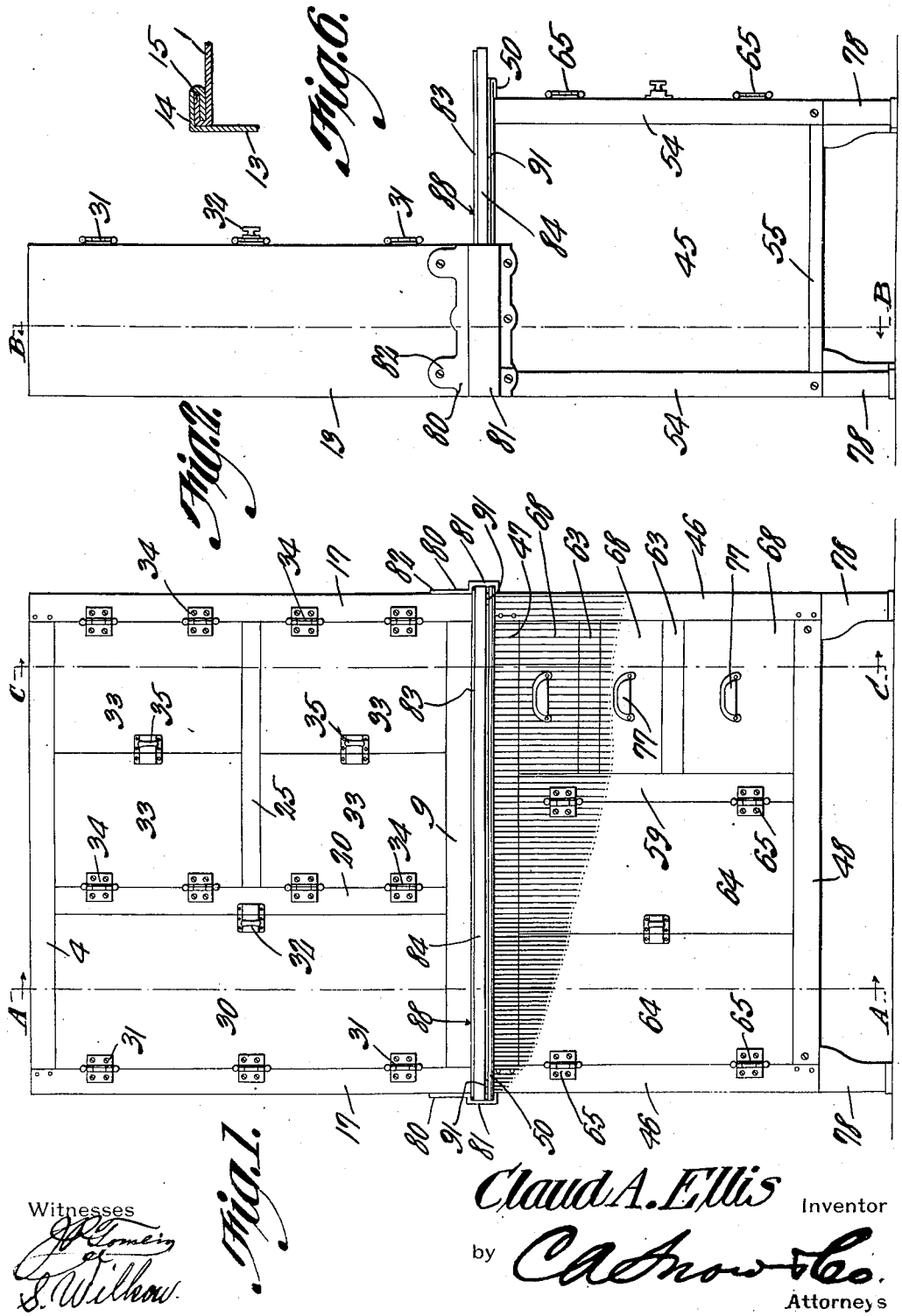

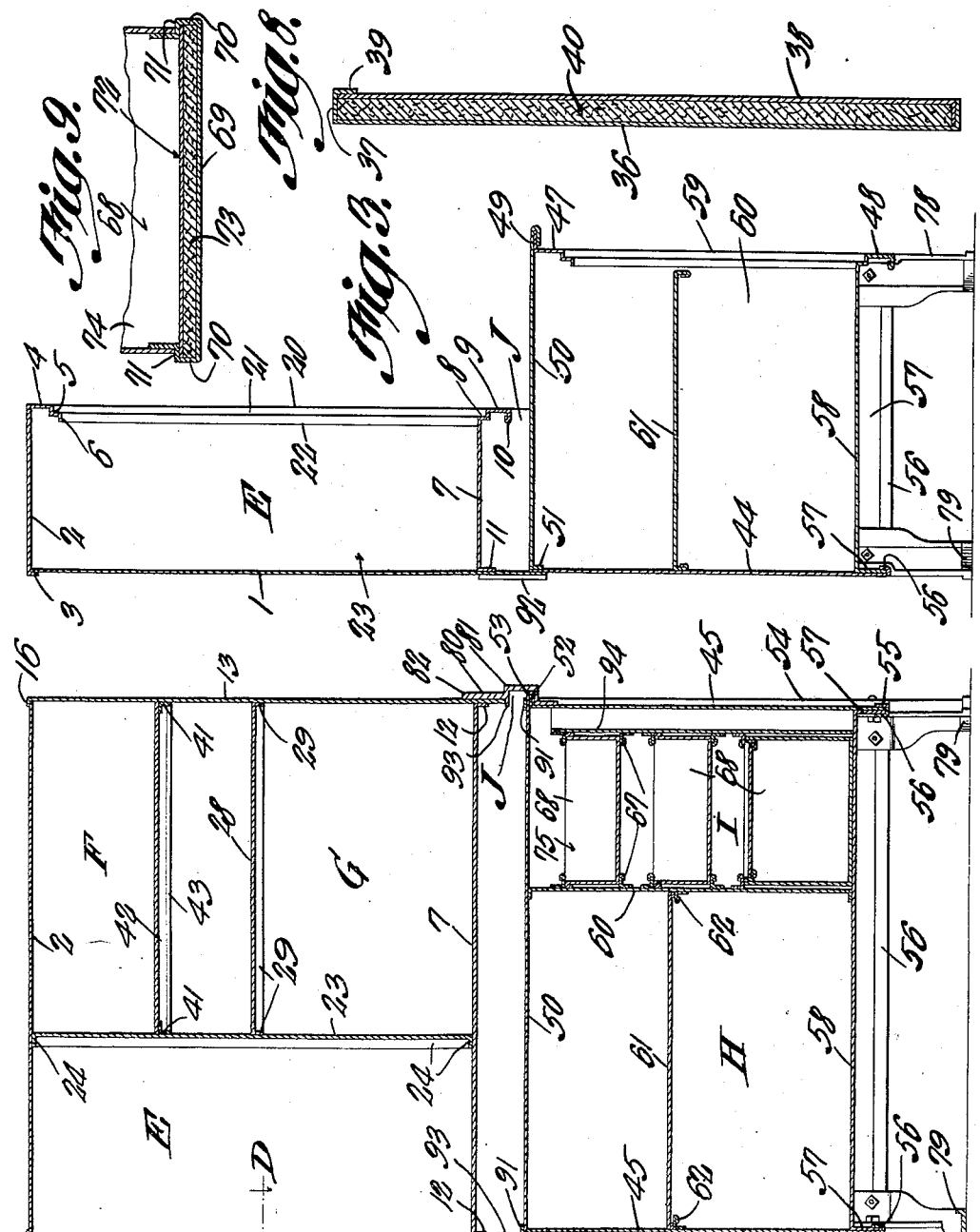

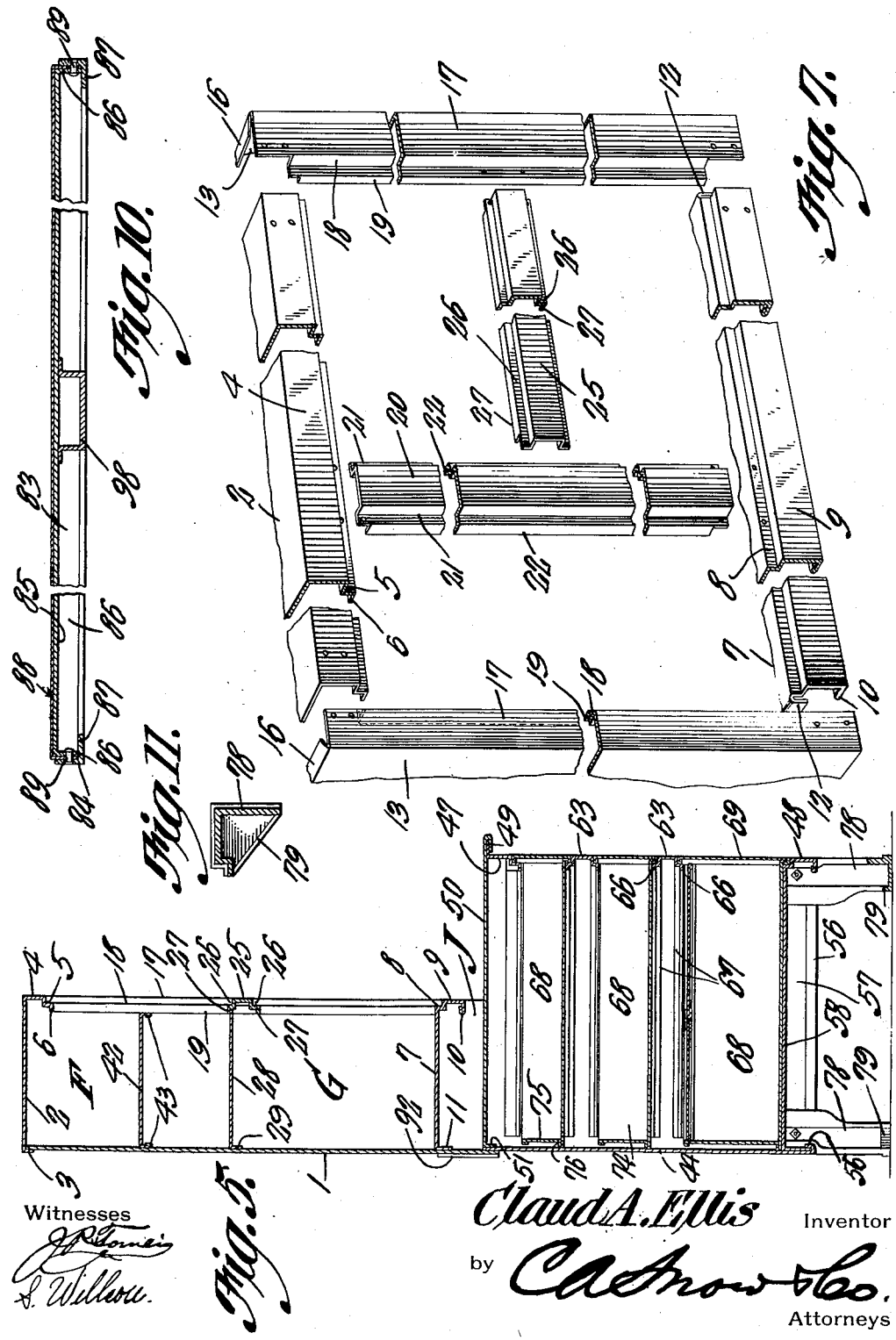

CLAUD A. ELLIS, OF ST. CHARLES, ILLINOIS, ASSIGNOR TO THE FAULTLESS IRON WORKS, OF ST. CHARLES, ILLINOIS.

KITCHEN-CABINET.

1,121,816.  Specification of Letters Patent.  Patented Dec. 22, 1914.

Application filed January 31, 1913. Serial No. 745,520.

*To all whom it may concern:*

Be it known that I, CLAUD A. ELLIS, a citizen of the United States, residing at St. Charles, in the county of Kane and State of Illinois, have invented a new and useful Kitchen-Cabinet, of which the following is a specification.

This invention relates to kitchen cabinets, its object being to provide an all metal cabinet, the various parts of which are formed of sheet metal which can be readily shaped and which, when assembled, forms an attractive finished structure.

Another object is to provide a kitchen cabinet certain of the parts of which are so shaped as to constitute seats for the fronts of drawers and for the doors so that the outer faces of the doors and said fronts will lie flush with the front of the cabinet structure or frame.

Another object is to provide front frame members having inwardly directed portions constituting means for supporting or attaching the vertical and horizontal partitions, for supporting guides for the drawers and certain of which frame members are extended to form certain of the walls of the structure.

A further object is to provide drawer fronts and doors so constructed as to deaden the metallic sound which is ordinarily produced by striking metal.

A further object is to provide a kneading board of novel construction and improved means for guiding and mounting the same, the said guiding means constituting a connection between the upper and lower members of the cabinet.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a front elevation of the cabinet. Fig. 2 is a side elevation thereof. Fig. 3 is a section on line A—A Fig. 1, the kneading board being removed. Fig. 4 is a section on line B—B Fig. 2, the kneading board being removed. Fig. 5 is a section on line C—C Fig. 1, the kneading board being removed. Fig. 6 is a section on line D—D Fig. 4. Fig. 7 is a perspective view of the upper front members of the cabinet, the said members being separated and portions of them being broken away. Fig. 8 is a vertical transverse section through one of the doors of the cabinet. Fig. 9 is a horizontal section through the front portion of one of the drawers of the cabinet. Fig. 10 is an enlarged transverse section through the kneading board or table, portions thereof being broken away. Fig. 11 is a detail view of one of the legs of the cabinet.

As hereinbefore stated, all parts of the cabinet are formed of sheet metal. In the form of cabinet illustrated, upper and lower sections are provided, the upper section being connected to the lower section in a novel manner as will be hereinafter set forth. Furthermore, in the type of cabinet shown, the upper section is divided into a side compartment E extending throughout the height thereof and into upper and lower compartments F and G arranged at one side of the compartment E.

The back of the top section is formed in a single sheet of metal, indicated at 1 and resting upon the upper edge of this back plate or sheet is the sheet metal top 2 of the cabinet, said top having a downwardly extending flange 3 bearing against the back surface of the sheet 1 and held thereto by rivets or in any other preferred manner. This top sheet 2 extends throughout the width of the cabinet and constitutes a rearwardly projecting extension or flange formed along the upper edge of the top frame member 4. This frame member extends throughout the width of the cabinet and is provided, throughout the length of its lower portion with a rabbet 5 from which projects an inwardly extending flange 6.

The bottom of the top section of the cabinet is formed of a sheet of metal, such as indicated at 7, this sheet constituting a backwardly projecting flange or extension formed along the upper edge of a rabbet 8 which extends throughout the length of the lower front frame member 9 of the cabinet, the lower edge of said frame member being extended inwardly to form a flange, 110 as shown at 10. This flange 10 and the rabbet 8 extends throughout the length of the member 9 and formed along the rear and the side edges of the bottom sheet 7 are depending flanges 11 and 12 respectively. The rear flange 11 is adapted to be riveted or otherwise secured to the back 1. The side flanges 12 are riveted or otherwise secured to sheets 13 constituting the sides of the upper section. Each of these sheets has a flange 14 extending from its rear edge and which is turned back so as to interlock with a flange 15 formed along the side of the back 1. This arrangement of interfitting flanges has been illustrated in section in Fig. 6. Flanges 16 are formed along the upper edges of the sides 13 and extend over the side portions of the top 2 and are riveted or otherwise secured thereto. These side sheets 13 constitute rearwardly projecting extensions or flanges arranged along the outer edges of the front side members 17 of the cabinet, the upper and lower ends of these front side members lapping the ends of the top and bottom frame members 4 and 9 and being secured thereto by rivets or the like. The inner sides of the members 17 are provided with rabbeted extensions 18 the ends of which fit within the rabbets 5 and 8 and inwardly extended flanges 19 are formed along the inner edges of these rabbets and bear, at their ends, against the flange 6 and the bottom 7.

Interposed between the side frame members 17 and the top and bottom frame members 4 and 9 is an intermediate vertical frame member 20 the ends of which are adapted to fit within the rabbets 5 and 8. This vertical frame member has the rabbets 21 formed along the sides thereof and inwardly extended flanges 22 are provided along the free edges of the rabbets and abut against the flange 6 and the bottom 7 respectively. One of these flanges 22 is riveted or otherwise secured to a vertical partition 23 formed of sheet metal and provided at its rear, top and bottom edges, with flanges 24 riveted or otherwise secured to the back 1, top 2, and bottom 7 respectively. Thus it will be seen that the side compartment E is formed.

Interposed between the vertical frame member 20 and one of the side frame members 17 is an intermediate horizontal frame member 25 which is provided along its upper and lower edges with rabbets 26 extending throughout the length thereof, the ends of this frame member being fitted snugly within the rabbets 18 of one of the side members 17 and within one of the rabbets 21 of the vertical frame member 20. Inwardly extending flanges 27 are formed along the free edges of the rabbets and abut against the flanges 19 and 22 of the adjacent side members 17 and of the vertical member 20. The end portions of the frame member 25 are riveted or otherwise attached to the members 17 and 20 and the said frame member 20 is riveted or otherwise secured to the members 4 and 9. A horizontal partition, formed in a single sheet of metal, and which has been illustrated at 28, is riveted or otherwise secured to the upper flange 27 of the frame member 25 and is provided along its side and rear edges with flanges 29 which are riveted or otherwise secured to the back 1, partition 23, and one of the sides 13. Thus it will be seen that the two compartments F and G are formed.

Attention is called to the fact that when the several front frame members of the upper section of the cabinet are assembled, their outer or front faces will be flush and the open front end of each of the compartments within said section will be completely surrounded by a seat formed by the several rabbets which merge one into the other. The depth of these rabbets is such as to permit the doors of the several compartments to rest with their outer faces flush with the corresponding faces of the frame members when the doors are closed. As shown in the drawings, a single door 30 is preferably provided for the side compartment E, said door being mounted upon hinges 31 and being provided with a suitable fastening device 32. Each of the compartments F and G is preferably provided with two doors arranged opposite to each other, as shown at 33, these doors being mounted on hinges 34 and being provided with suitable fastenings 35. Each door is preferably formed of a front plate 36 having flanges 37 along the edges thereof adapted to receive between them a flanged back plate 38 held in position by bending one or more of the flanges 37 so as to lap the plate 38 as shown at 39. The space thus formed between the plates 32 and 38 is provided with a filling 40 made up of a suitable fibrous material saturated with paraffin. This filler serves as a means for deadening sound and destroys or greatly reduces the metallic ring which would otherwise be produced when the door is handled. It is to be understood that either or both of the compartments F and G can be provided with supporting cleats such as shown at 41, these cleats serving to support a shelf 42 formed of sheet metal. The front and rear edges of the shelf can be flanged, as shown at 43, so as to prevent sagging.

The construction of the lower section of the cabinet is very similar to that of the upper section. This lower section includes a back 44 formed of sheet metal and the side edge portions of which interlock with the sides 45 of the section, these sides being likewise formed of sheet metal. The sides 45 constitute rear extensions or flanges formed along the outer side edges of the front side frame members 46 which are similar in construction to the side frame members 17 and lap and fit snugly against top and bottom frame members 47 and 48 of the lower section. The top frame section 47 has a forwardly extended flange 49 extending throughout the length of its upper edge, said flange being engaged by the inturned front edge portion of the top sheet 50 of the lower section, said top section having a downwardly extending flange 51 which is riveted or otherwise secured to the back 44. The sides of the top 50 are bent downwardly and inwardly, as shown at 52, so as to engage outturned flanges 53 formed along the upper edges of the sides 45.

As shown in Fig. 2, the front and back edge portions of each side 45 can be pressed outwardly, as at 54 so as to imitate finishing strips or corner posts and reinforcing metallic straps 55 may also be secured along the lower edge of each side 45 upon the outer face thereof so as to extend up to the outpressed portion 54, these straps 55 also serving to imitate cleats used to give a finished appearance to the sides of the base or bottom section. Furthermore the strips 55 constitute reinforcing means to prevent the sheet metal sides 45 from buckling along their lower edges.

The lower edges of the back and sides of the lower section are bent inwardly and upwardly, as shown at 56 so as to engage downwardly extending flanges 57 formed along the sides and back of the bottom 58 of the lower section, this bottom being formed of sheet metal and constituting a rearwardly projecting extension or flange formed along the upper edge of the bottom frame member 48. An intermediate vertical frame member 59 is interposed between the frame members 47 and 48 and has a partition 60 riveted or otherwise secured thereto and to the top 50, the bottom 58, and the back 44. This partition divides the lower section into two compartments H and I and the compartment H may be provided with a shelf 61 removably mounted on supporting cleats 62 riveted or otherwise secured to one of the sides 45 and to the partition 60. This shelf may be similar to the shelf 42. One or more horizontal frame members 63 are interposed between the vertical frame member 59 and one of the side frame members 46, these frame members 63 being extended across the front of the compartment I. All of the frame members 46, 47, 48, 49 and 63 are rabbeted and are fitted together in the same manner as are the frame members which are illustrated in Fig. 7. Doors 64 may be hingedly mounted as at 65 so as to close the front of the compartment H, these doors, when closed, being disposed with their front faces flush with the front faces of the front frame members 47, 48, 46 and 59.

As hereinbefore stated the frame members of the lower section are similar in construction to the frame members of the upper section. For example the frame members 63 are provided with rearwardly extending upper and lower flanges 66. Secured to these flanges are angular guide cleats 67 which are likewise secured to the side walls of the compartment I. These cleats constitute guides for the upper and lower edges of drawers 68 which are slidably mounted within the compartment I. Each drawer is formed entirely of sheet metal and has its front made up of a front plate 69 having rearwardly extending flanges 70 offset, as at 71, so as to lap and retain a back plate 72. A filling 73 of fibrous material saturated preferably with paraffin, is interposed between the plates 69 and 72. Flanges 71 are riveted or otherwise secured to a metal sheet 74 which is bent to form the bottom and sides of the drawer. A rear plate 75 formed of sheet metal is interposed between the sides of each drawer and is riveted to said sides and to the bottom of the drawer, said plate 75 being provided with rearwardly extending flanges 76 for the reception of the rivets. The upper edges of the walls of the drawer are folded downwardly so as to present broad bearing edges adapted to contact with the adjacent guide cleats 67. It is to be understood that the drawers are so proportioned as to fit snugly between the cleats and, when the drawers are pushed into the cabinet, the fronts of the drawers will fit snugly within the seats formed by the rabbets of the frame members 46, 59, 63, 47 and 48, and, therefore, the front faces of the drawers will lie flush with the front faces of the frame members. Each drawer may be provided with a pull such as indicated at 77.

Fitted within each angle formed by the frame member 48, sides 45 and back 44 and below the bottom 58 are legs 78 the upper ends of which are preferably pressed inwardly so as to fit snugly within said angles and to allow the exposed portions of the outer faces of the legs to lie flush with the adjacent faces of the cabinet structure. The legs may be mounted on suitable casters if desired and each leg is provided, at its lower end, with an inwardly and upwardly extended portion 79 constituting a cup for holding oil or any other suitable substance which will prevent insects from crawling up the legs of the cabinet.

The walls of the upper section of the cabinet are so proportioned as to fit close to and slightly lap the corresponding walls of the lower section of the cabinet. For the purpose of holding the two sections properly spaced apart, combined guides and connecting brackets are used. Each of these brackets is in the form of a plate 80 having a central longitudinal channel 81 within its inner face. Ears 82 extend upwardly from the central channeled portion and are secured to the sides of the upper and lower sections respectively of the cabinet. When the ears are thus attached, the two sections will be fixedly connected but the bottom of the upper section will be held spaced from the top of the lower section, as will be apparent by referring to Figs. 3 and 5. The space thus formed, and which has been indicated at J constitutes a housing for a portion of a kneading board or table 83 likewise formed of metal. This kneading board consists of a single angle strip 84 bent to form a rectangular frame, the ends of the angle strip being secured together in any suitable manner. A metallic sheet 85 is arranged above this frame and has marginal flanges 86 extending downwardly so as to fit snugly within the frame and to bear upon the base flanges 87 of the frame. This sheet 85 is provided with a covering 88 of tin or any other suitable material, the edge portions of the covering being turned downwardly so as to fit between the flanges 86 and the sides of the frame 84. The several parts are held together by rivets, as shown at 89. A reinforcing channeled cleat 98 may be secured along the center of the bottom face of sheet 85 so as to rest upon the top 50 and thus prevent the middle portion of the kneading board from sagging under the pressure to which it is subjected. Wear strips 91 may be secured upon the side portions of the top 50 and the frame 84 is adapted to rest upon these strips. The side edges of the kneading board project into the channels 81 so as thus to properly guide the kneading board in its movement into and out of active position. The inwardly extending flange 10 of the frame member 9 serves likewise as a guide for the kneading board and prevents it from being swung upwardly out of position. The downwardly projecting portion of the back 1 which is located below the bottom 7 is preferably provided with short reinforcing straps such as indicated at 92.

Importance is attached to the fact that all of the front frame members are of the same cross sectional contour and can be readily rolled in proper form and, after being cut to desired lengths, can be quickly and accurately assembled, the parts when assembled presenting a smooth front and the entire finished cabinet being attractive as well as light and durable.

While the structure herein described has been referred to as a kitchen cabinet, it is to be understood that many of the features embodied therein can be used in the formation of other articles of metal furniture.

It will be noted by referring particularly to Fig. 4 that the brackets 80 are provided, upon their inner faces, and close to and above the channels 81, with longitudinally extending ribs 93 constituting supports on which the lower edges of the sides 13 rest. In order that the guide cleats 67 may be properly supported back from the front frame members and held properly spaced from the adjacent side of the lower section of the cabinet, a combined spacing and supporting plate 94 is secured to the inner surface of that side 45 of the cabinet constituting one wall of the compartment I. One set of cleats are then secured to this plate 94.

It is to be understood that various fixtures may be arranged within the different compartments of the cabinet and the drawers can be adapted for holding any material desired.

What is claimed is:—

1. A metallic cabinet including opposed sheet metal members having longitudinal rabbets and backwardly extending portions arranged longitudinally along the rabbets, a frame member interposed between the first named members and having a longitudinal rabbet terminating at its ends within the rabbets of the first named members, said frame members being secured together and having their outer faces flush, and a rearwardly projecting portion extending from the rabbet of the interposed member and abutting at its ends against the adjacent sides of the first named members.

2. A metallic cabinet including upper and lower frame members, backwardly extending portions integral therewith and extending longitudinally thereof, said portions constituting the top and bottom respectively of a compartment in the cabinet, side frame members, backwardly extending portions integral therewith and extending longitudinally thereof and constituting the side walls of a compartment in the cabinet, flanges extending from said rearwardly extending portions of the side frame members for lapping and attachment to the rearwardly extending portion of the top frame member, flanges extending from the rearwardly extending portion of the bottom frame member for attachment to the sides of the compartment, a back plate, and means carried by said rearwardly extending portion for attachment to the back plate.

3. A metallic cabinet including upper and lower frame members, each of said frame members having a rearwardly extending portion extending throughout the length thereof, said portions constituting the top and bottom respectively of a compartment of the cabinet, side frame members having rearwardly extending portions each constituting the side wall of a compartment, said upper and lower frame members abutting against said side walls, a metallic back, means upon the backwardly extending portions for attachment to the back and to each other.

4. A metallic cabinet including upper and lower frame members, each of said frame members having a rearwardly extending portion extending throughout the length thereof, said portions constituting the top and bottom respectively of a compartment of the cabinet, side frame members having rearwardly extending portions each constituting a side wall of a compartment, said upper and lower frame members abutting against said side walls, a metallic back, means upon the backwardly extending portions for attachment to the back and to each other, and intermediate front members, the ends of each intermediate member abutting against the intermediate portions of the adjacent frame members, the front faces of all of the frame members being flush.

5. A metallic cabinet including upper and lower frame members, each of said frame members having a rearwardly extending portion extending throughout the length thereof, said portions constituting the top and bottom respectively of a compartment of the cabinet, side frame members having rearwardly extending portions each constituting a side wall of a compartment, said upper and lower frame members abutting against said side walls, a metallic back, means upon the backwardly extending portions for attachment to the back and to each other, and intermediate front members, the ends of each intermediate member abutting against the intermediate portions of the adjacent frame members, the front faces of all of the frame members being flush, each of said frame members having a longitudinal rabbet, the rabbets of the intermediate frame members terminating within the rabbets of the adjacent members and the rabbets of the side frame members terminating within the rabbets of the upper and lower frame members, all of said rabbets coöperating to form closure seats.

In testimony that I claim the foregoing as my own, I have hereto affixed my signature in the presence of two witnesses.

CLAUD A. ELLIS.

Witnesses:
  K. D. LEWIS,
  H. W. BLASHFIELD.